United States Patent Office 3,658,845
Patented Apr. 25, 1972

3,658,845
BENZOTHIOPHENE AMINOKETONES AND AMINOALCOHOLS

Klaus Posselt, Bergen-Enkheim, and Kurt Thiele, Frankfurt am Main, Germany, assignors to Deutsche Gold- und Silber-Scheideanstalt vormals Roessler, Frankfurt am Main, Germany
No Drawing. Original application Dec. 26, 1967, Ser. No. 693,138, now Patent No. 3,514,465, dated May 26, 1970. Divided and this application Mar. 10, 1970, Ser. No. 18,300
Claims priority, application Germany, Dec. 30, 1966, D 51,910, D 51,911
Int. Cl. C07d 63/22
U.S. Cl. 260—330.5
3 Claims

ABSTRACT OF THE DISCLOSURE

Compounds of the formula

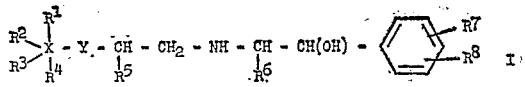

their salts and quaternary ammonium compounds, as well as their optically active isomers or diastereomers wherein $R^1$ to $R^4$ represent hydrogen, halogen, lower alkyl, aralkyl, phenyl, hydroxyl, lower alkoxy, nitro or lower carboalkoxy, $R^5$ and $R^6$ are hydrogen or methyl, $R^7$ and $R^8$ are hydrogen, halogen or lower alkoxy, X is a heterocyclic ring system, mono- or condensed bicyclic, with 1–4 hetero atoms, in which the individual rings have 5 to 6 members and can also contain 1 or more carbonyl groups, Y is —CO— or —CH(OH)—. These compounds have pharmacological activity in that they increase the coronary blood flow by simultaneously causing dilation of the coronaries and an increase in contraction strength.

---

This application is a division of application Serial No. 693,138, filed Dec. 26, 1967, and now U.S. Pat. No. 3,514,465 issued May 26, 1970.

DETAILED DESCRIPTION OF THE INVENTION INCLUDING PREFERRED EMBODIMENTS

The following heterocyclic ring systems, for example, come into consideration for the compounds according to the invention: furane, thiophene, pyrrole, pyrazole, thiazole, pyridine, pyrimidine, triazine, pyrazolone, benzofurane, benzothiophene, indole, quinoline, isoquinoline, benzodioxol, benzodioxane, decahydroisoquinoline, benzothiazole and benzimidazole.

The compounds according to the invention of the above Formula I can be produced in a known manner by (a) reacting a compound of the formula

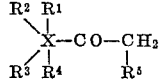

II with a compound of the formula

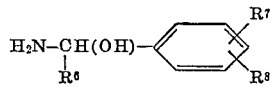

III in the presence of formaldehyde or a formaldehyde source and a solvent.

(b) Reacting a compound of the formula

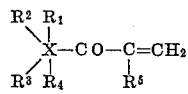

IV or the corresponding Mannich base of the formula

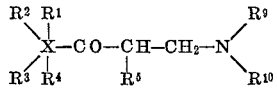

wherein $R^9$ and $R^{10}$ are lower alkyl with a compound of Formula III or (c) reacting a compound of the formula

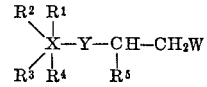

with a compound of the formula

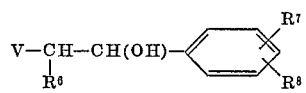

in which W and V are different and are either halogen or $NH_2$ in the presence of a basic substance and, if desired, in the event Y is CO, reducing such group to a CH(OH) group and, if desired, converting the bases produced into their pharmacologically acceptable acid addition salts or quaternary ammonium salts.

The process according to method (a) is carried out in the usual manner at a temperature between 20 and 150° C. Alcohols, dioxane, glacial acetic acid and the like come into consideration as solvents.

The process according to method (b) in general when using an unsaturated ketone of Formula IV can be carried out at temperatures between 20 and 80° C. in an inert solvent, such as, ether, acetone, dioxane or chloroform, whereas when the corresponding Mannich base is used, which during the reaction is transformed into an intermediate of Formula IV, the reaction temperature used is normally higher, preferably, between 80 and 120° C., and solvents such as water, alcohol/water, or a two phase system such as benzene/water toluene/water come into consideration.

The process according to method (c) is usually carried out at elevated temperatures in a solvent such as alcohols, ether, dimethyl formamide and the like.

The compounds produced which contain optically active carbon atoms and which as a rule are produced as racemates can be resolved into their optically active isomers in the usual manner, for example, with the aid of an optically active acid. It, however, is also possible to employ optically active compounds or diastereomers as the starting materials whereby the end product in the corresponding pure optically active form or diastereomeric configuration is obtained.

The free bases can be converted into their salts with the usual pharmacologically acceptable acids such as HCl, HBr, $H_2SO_4$, acetic acid, citric acid, succinic acid, maleic acid, fumaric acid, lactic acid, p-toluene sulfonic acid and the like. Those compounds containing basic tertiary nitrogen atoms can be converted to their quaternary salts with the usual pharmacologically acceptable quaternizing agents such as the lower alkyl halides. The free bases can be removed from the salts, for example, by treatment with aqueous NaOH and other salts can be prepared from such free bases.

As already indicated, the compounds according to the invention have a pharmacological activity in that they increase the coronary blood flow by causing dilation of the coronaries, as well as an increase in contraction strength of the heart.

When tested on the isolated guinea pig heart according to Langendorff (Pflüger's Arch. 61, 291, 1895) it was found that the compounds according to the invention were active in doses between 10–500 μg./heart (μg.=γ= microgram) in dilating the coronaries while simultaneously increasing the contraction strength.

The indications for the compounds according to the invention are:

Coronary insufficiency
Angina pectoris
Myocardial infarct
Myocardial insufficiency
Circulatory disturbances of various geneses
Disturbances of the peripheral and cerebral blood flow
Migraines
Arteriosclerosis The novel compounds can be used, if desired, also in combination with other medicaments in the form of pharmaceutical compositions suited for enteral, parenteral, oral or per lingual application.

The acute toxicity of the compounds according to the invention when tested on mice by the method of Miller and Tainter (Proc. Soc. Exper. Biol. a Med. 57, 261, 1944) expressed as the LD 50 is between 100 mg./kg. and 5000 mg./kg. oral.

The individual doses for human beings, depending on form of administration are between 0.5 and 100 mg., one or more times a day.

The following examples will serve to illustrate the compounds according to the invention. For sake of simplicity the symbol Z is used in the structural formulae and nomenclature of a number of the examples to represent, respectively

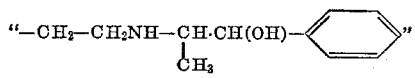

"2-[3-phenyl-3-hydroxy-propyl-(2)-amino]-ethyl"

EXAMPLE 1

1-{2-[3-phenyl-3-hydroxy-propyl - (2) - amino-ethyl}-thienyl-(2)-ketone, that is, 1-{Z}-thienyl-(2)-ketone

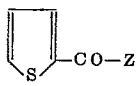

Method (a)

12.6 g. (0.1 mol) of 2-acetyl-thiophene, 18.7 g. (0.1 mol) of 1-norephedrine·HCl and 4 g. (0.13 mol) of paraformaldehyde were dissolved in 20 ml. of isopropanol and after addition of 0.2 mol of concentrated HCl boiled under reflux for 2 hours. Thereafter 100 ml. of acetone were added to the still warm solution. The hydrochloride which crystallized out upon cooling was purified by recrystallization from ethanol. Its melting point was 191–192° C. and the yield 17 g.

Method (b)

1.5 g. (0.01 mol of 1-norephedrine were dissolved in 50 ml. of ether and 2.7 g. (0.02 mol) of thienyl vinyl ketone dissolved in 10 ml. of ether added thereto. After ½ hour 2 g. of the base separated out which after recrystallization from ethanol had a melting point of 118–120° C. The hydrochloride produced therefrom had a melting point of 191–192° C.

Method (c)

5.2 g. (0.03 mol) of 2-[β-chloropropionyl]-thiophene were dissolved in dimethyl formamide and united with a solution of 4.5 g. (0.03 mol) of 1-norephedrine and 4 g. (0.03 mol) of triethylamine in 25 ml. of dimethyl formamide. After 1 hour the triethylamine HCl which was formed was filtered off and the filtrate acidified with isopropanolic HCl. Subsequently, the HCl salt was precipitated from the solution by addition of ether and recrystallized from ethanol. Its melting point was 191–192° C. and the yield was 7 g.

EXAMPLE 2

1-{Z}-phenyl-(2)-ketone

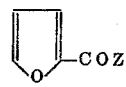

11 g. (0.1 mol) of 2-acetyl-furan, 18.7 g. (0.1 mol) of 1-norephedrine·HCl and 4 g. (0.13 mol) of paraformaldehyde were heated for 2 hours under reflux in 20 ml. of isopropanol with the addition of 5 drops of ethanolic HCl. The HCl salt which had precipitated out was stirred up with 50 ml. of acetone and filtered off. It was purified by recrystallization from ethanol. Its melting point was 186–187° C. and the yield was 10.5 g.

EXAMPLE 3

1-{Z}-[4-methyl-thiazolyl-(2)]-ketone

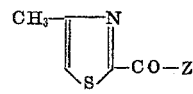

7 g. (0.05 mol) of 4-methyl-2-acetyl-thiazole, 9.4 g. (0.05 mol) of 1-norephedrine·HCl, 2 g. (0.067 mol) of paraformaldehyde and 5 drops of isopropanolic HCl in 20 ml. of isopropanol were reacted and processed as in Example 2. The HCl salt was recrystallized from methanol. Its melting point was 197–199° C. and the yield 7 g.

EXAMPLE 4

1-{Z}-antipyryl-(4)-ketone

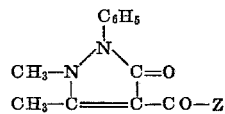

11.5 g. of 4-aceytl-antipyrin (0.05 mol), 9.5 g. of norephedrine·HCl (0.05 mol) and 2 g. of paraformaldehyde (0.067 mol) were introduced into 20 ml. of isopropanol and 5 drops of isopropanolic HCl added thereto and the mixture boiled for a total of 5 hours during which after 3 hours an additional 1 g. of paraformaldehyde was added. Thereafter the solvent was distilled off and the residue treated with aqueous soda. The oily Mannich base produced was crystallized with the aid of ether. It formed the dihydrochloride with 2 mol of HCl which was recrystallized from ethanol. Its melting point was 206–208° C. and the yield was 9 g.

EXAMPLE 5

1-{Z}-pyridyl-(3)-ketone

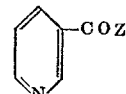

40 g. (0.33 mol) of 3-acetyl-pyridine, 18.7 g. (0.1 mol) of 1-norephedrine·HCl and 3 g. (0.1 mol) of paraformaldehyde were boiled under reflux in 15 ml. of isopropanol for a total of 3 hours. An additional 1 g. of paraformaldehyde was added after 1 hour. Thereafter the reaction mixture was diluted with acetone and the precipitated HCl salt was recrystallized from methanol/ethanol (1:2). Its melting point was 187–189° C. and the yield 7 g.

EXAMPLE 6

1-{Z}-[2,4-dimethyl-thiazolyl-(5)]-ketone

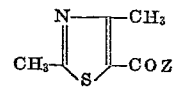

25 g. (0.16 mol) of 2,4-dimethyl-5-acetyl-thiazole, 30 g. (0.16 mol) of 1-norephedrine·HCl and 5 g. (0.16 mol)

of paraformaldehyde were introduced into 50 ml. of isopropanol and 15 drops of isopropanolic HCl added thereto. The mixture was boiled on a water bath for a total of 1 hour. An additional 1.5 g. of paraformaldehyde was added after ½ hour. The reaction solution was diluted with 100 ml. of acetone while still warm. The HCl salt which precipitated out was recrystallized from 80% ethanol. Its melting point was 208–210° C. and the yield 6.6 g.

EXAMPLE 7

1-{Z}-[4-methyl-2-hydroxy-thiazolyl-(5)]-ketone

5 g. (0.035 mol) of 4-methyl-2-hydroxy-5-acetyl-thiazole, 6.6 g. (0.035 mol) of 1-norephedrine·HCl and 1.5 g. (0.05 mol) of paraformaldehyde were boiled under reflux for 2 hours in 20 ml. of glacial acetic acid. The HCl salt which crystallized out on cooling was recrystallized from methanol/ethanol (1:1). Its melting point was 209–210° C. and the yield 4.5 g.

EXAMPLE 8

1-{Z}-cumaronyl-ketone

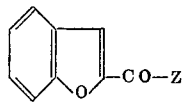

40 g. (0.25 mol) of 2-acetyl cumarone, 46.5 g. (0.25 mol) of 1-norephedrine·HCl and 7.5 g. (0.25 mol) of paraformaldehyde were dissolved in 200 ml. of isoamyl alcohol and after addition of 10 drops of ethanolic·HCl boiled under reflux for ½ hour. Then an additional 2.5 g. (0.083 mol) of paraformaldehyde were added and the mixture refluxed for a further ¼ hour. The solution was diluted with 100 ml. of acetone while still warm. Upon cooling the HCl salt crystallized out. It was recrystallized from ethanol. Its melting point was 199–200° C. and the yield 31.5 g.

EXAMPLE 9

1-3-{3-[3-phenyl-3-hydroxy-propyl-(2)-amino]-propionyl}-thionaphthene

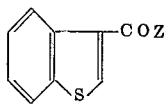

17.6 g. (0.1 mol) of 3-acetyl-thionaphthene, 18.7 g. (0.1 mol) of 1-norephedrine·HCl and 4.5 g. (0.15 mol) of paraformaldehyde were boiled under reflux for 2 hours in 50 ml. of isopropanol. The solution was then diluted with 100 ml. of acetone while still warm. Upon cooling the HCl salt precipitated out. It was recrystallized from methanol. Its melting point was 220–221° C. and the yield 18.5 g.

EXAMPLE 10

1-3-{3-[3-phenyl-3-hydroxy-propyl-(2)-amino]-propionyl}-1-methyl-indole

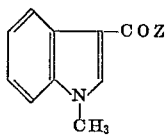

25 g. (0.13 mol) of 1-methyl-3-acetyl-indole, 24.3 g. (0.13 mol) of 1-norephedrine·HCl and 5 g. (0.17 mol) of paraformaldehyde were dissolved in 100 ml. of isopropanol and boiled under reflux for a total of 6 hours. After the second and fourth hours an additional 2.5 g. of paraformaldehyde were added. Thereafter the solvent was distilled off and the residue dissolved in warm acetone. The HCl salt which crystallized out on cooling was recrystallized from ethanol. Its melting point was 194–195° C. and the yield 22 g.

EXAMPLE 11

1-5-{3-[3-phenyl-3-hydroxy-propyl-(2)-amino]-propionyl}-benzodioxol-(1,3)

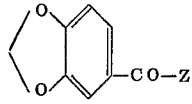

8 g. (0.048 mol) of 5-acetyl-benzodioxol-(1,3), 9.1 g. (0.048 mol) of 1-norephedrine·HCl and 2.9 g. (0.097 mol) of paraformaldehyde were boiled on a water bath for 2 hours in 30 ml. of isopropanol after addition of 5 drops of isopropanolic HCl. After addition of 100 ml. of acetone to the warm reaction solution, the HCl salt precipitated out. It was recrystallized from ethanol. Its melting point was 195–197° C. and the yield 9 g.

EXAMPLE 12

1-4{3-[3-phenyl-3-hydroxy-propyl-(2)-amino]-propiomyl}-1,3-dimethyl and -1,5-dimethyl pyrazole (mixture)

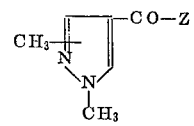

26 g. (0.19 mol) of the isomeric mixture of 1,3- and 1,5 - dimethyl-4-acetyl-pyrazole formed during the synthesis, 37.4 g. (0.2 mol) of 1-norephedrine·HCl and 9 g. (0.3 mol) of paraformaldehyde were boiled under reflux under an atmosphere of nitrogen in 150 ml. of isopropanol for 3 hours. Upon cooling the HCl salt crystallized. It was recrystallized from isopropanol and then twice from ethanol. Its melting point was 196° C. and the yield 11 g.

EXAMPLE 13

1-{Z}-quinolyl-(3)-ketone

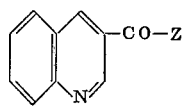

10 g. (0.058 mol) of 3-acetyl quinoline, 11.2 g. (0.058 mol) of 1-norephedrine·HCl and 1.6 g. (0.058 mol) of paraformaldehyde were boiled under reflux on a water bath in 75 ml. of isopropanol for 2.5 hours. An additional 0.8 g. (0.026 mol) of paraformaldehyde was added after 1 hour's boiling. Upon addition of 150 ml. of acetone the HCl salt precipitated out. It was recrystallized from 80% methanol. Its melting point was 205–206° C. and the yield 5 g.

EXAMPLE 14

1-{Z}-isoquinolyl-(4)-ketone

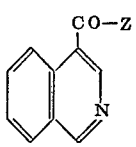

5 g. (0.024 mol) of 4-acetyl isoquinoline·HCl, 4.6 g. (0.024 mol) of 1-norephedrine·HCl and 0.7 g. (0.024 mol) of paraformaldehyde were boiled on a water bath for 2.5 hours in 50 ml. of a 1:1 mixture of ethanol-isopropanol and an additional 0.4 g. (0.012 mol) of paraformaldehyde was added after 1 hour's boiling. Upon cooling, the dihydrochloride salt precipitated out. It was recrystallized from ethanol. Its melting point was 208° C. and the yield 3 g.

EXAMPLE 15

1-{Z}-[1,2,4-trimethyl-5-carbethoxypyrrolyl-(3)]-ketone

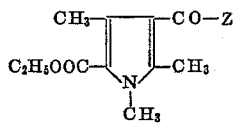

18 g. (0.081 mol) of 1,2,4-trimethyl-3-acetyl-5-carbethoxypyrrole, 15.2 g. (0.081 mol) of 1-norephedrine·HCl and 2.4 g. (0.081 mol) of paraformaldehyde were boiled on a water bath for 1.5 hours in 50 ml. of isopropanol. An additional 1.2 g. of paraformaldehyde were added after ½ hour's boiling. Upon addition of 100 ml. of acetone the HCl salt precipitated out. It was recrystallized from ethanol. Its melting point was 178–180° C. and the yield 10 g.

EXAMPLE 16

1-6{3-[3-phenyl-3-hydroxy-propyl-(2)-amino]-propionyl}-benzodioxane-(1,4)

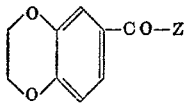

11.7 g. (0.066 mol) of 6-acetyl-1,4-benzodioxane, 12.5 g. (0.066 mol) of 1-norephedrine·HCl and 2 g. (0.067 mol) of paraformaldehyde were boiled on a water bath in 33 ml. of isopropanol for 2 hours. An additional 2 g. (0.067 mol) of paraformaldehyde were added after 1 hour's boiling. The solvent was distilled off and the residue treated with acetone. The HCl salt which precipitated out was recrystallized from ethanol. Its melting point was 201° C. and the yield 7.5 g.

EXAMPLE 17

1-2{3-[3-phenyl-3-hydroxy-propyl-(2)-amino]-propionyl}-benzodioxane-(1,4)

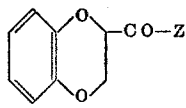

11 g. (0.061 mol) of 2-acetyl-1,4-benzodioxane, 11.6 g. (0.062 mol) of 1-norephedrine·HCl and 1.85 g. (0.062 mol) of paraformaldehyde were reacted in 30 ml. of isopropanol and processed as in Example 16. The melting point of the HCl salt was 178° C. and the yield 8 g.

EXAMPLE 18

1-{Z}-[2-benzyl-10-hydroxy-decahydroisoquinolyl-(4)]-ketone

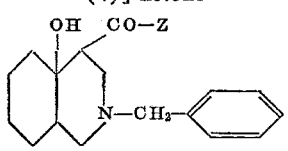

11 g. (0.0339 mol) of 2-benzyl-4-acetyl-10-hydroxy-decahydroisoquinoline·HCl, 6.5 g. (0.035 mol) of 1-norephedrine·HCl and 1.4 g. (0.047 mol) of paraformaldehyde were boiled on a water bath for 2 hours in 35 ml. of isopropanol. An additional 1.4 g. of paraformaldehyde were added after 1 hour's boiling. The solvent was then distilled off and acetone and ethyl acetate added to the residue. The dihydrochloride produced was recrystallized from ethanol. Its melting point was 182–183° C. and the yield 7 g.

EXAMPLE 19

1-{Z}-[5-nitro-furyl-(2)]-ketone

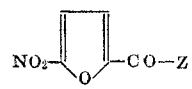

11.6 g. (0.075 mol) of 2-acetyl-5-nitro-furane, 14 g. (0.075 mol) of 1-norephedrine·HCl and 3 g. (0.1 mol) of paraformaldehyde in 50 ml. of isopropanol were heated on a water bath for 3 hours. The HCl salt which precipitated out upon cooling was recrystalized from 80% ethanol. Its melting point was 210° C. and the yield 3 g.

EXAMPLE 20

1-4-{3-[3-phenyl-3-hydroxy-propyl-(2)-amino]-propionyl}-1,3,5-trimethyl pyrazole

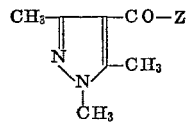

27 g. (0.178 mol) of 1,3,5-trimethyl-4-acetylpyrazole, 33 g. (0.177 mol) of 1-norephedrine·HCl and 10.8 g. (0.36 mol) of paraformaldehyde in 150 ml. of isopropanol were heated for 2 hours on a water bath. Thereafter the solvent was distilled off and 100 ml. acetone were added to the residue. The HCl salt whcih precipitated was recrystallized from isopropanol. Its melting point was 191° C. and the yield was 14.5 g.

EXAMPLE 21

1-4-{3-[3-phenyl-3-hydroxy-propyl-(2)-amino]-propionyl}-1-benzyl-3,5-dimethyl-pyrazole

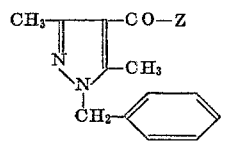

13.5 g. (0.0624 mol) of 3,5-dimethyl-1-benzyl-4-acetylpyrazole, 11.1 g. (0.0593 mol) of 1-norephedrine·HCl and 3.6 g. (0.12 mol) of paraformaldehyde were heated on a water bath in 200 ml. of isopropanol for 2 hours. The HCl salt precipitated out from the reaction solution after addition of 100 ml. of acetone and it was recrystallized from ethanol. Its melting point was 200° C. and the yield 11 g.

EXAMPLE 22 d,l-{2-[3-(3-fluoro-4-methoxy-phenyl)-3-hydroxy-propyl-(2)-amino]-ethyl}-thienyl-(2)-ketone

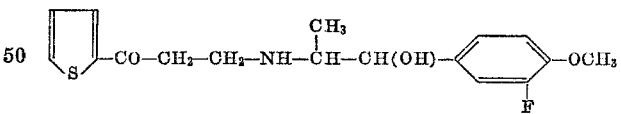

28 g. (0.119 mol) of d,l-3-(3-fluoro-4-methoxyphenyl)-3-hydroxy-propyl-(2)-amine·HCl, 15 g. (0.119 mol) of 2-acetyl-thiophene and 7.2 g. (0.24 mol) of paraformaldehyde were reacted in 200 ml. of isopropanol and processed as in Example 21. The HCl salt was recrystallized from ethanol. Its melting point was 208° C. and the yield was 10 g.

EXAMPLE 23

1-{1-[3-phenyl-3-hydroxy-propyl-(2)-amino]-propyl-(2)}-thienyl-(2)-ketone

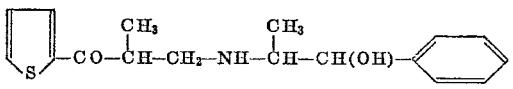

43 g. (0.307 mol) of 2-propionyl-thiophene, 57.7 g. (0.308 mol) of 1-norephedrine·HCl and 18.4 g. (0.614 mol) of paraformaldehyde were heated on a water bath in 50 ml. of isopropanol for 1 hour. 100 ml. of acetone were added to the reaction solution and the HCl salt which precipitated out recrystallized from ethanol. Its melting point was 208° C. and the yield was 16.5 g.

EXAMPLE 24

1-{Z}-5-chloro-thienyl-(2)-ketone

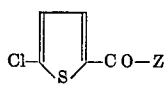

30 g. (0.187 mol) of 2-acetyl-5-chloro-thiophene, 35 g. (0.187 mol) of 1-norephedrine·HCl and 5.6 g. (0.187 mol) of paraformaldehyde were heated in 50 ml. of isopropanol and processed as in Example 21. The HCl salt was recrystallized from ethanol. Its melting point was 198° C. and the yield was 16 g.

EXAMPLE 25 d,l-{2-[2-(2-chloro-phenyl)-2-hydroxy-ethylamino] ethyl}-thienyl-(2)-ketone

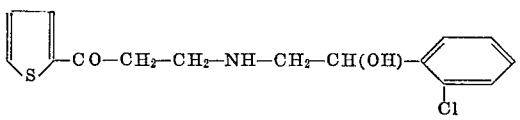

12.6 g. (0.1 mol) of 2-acetyl-thiophene, 20.8 g. (0.1 mol) of d,l - 2 - (2 - chloro-phenyl)-2-hydroxy-ethylamine HCl and 4.5 g. (0.15 mol) of paraformaldehyde were heated on a water bath for 2 hours in 100 ml. of isopropanol. Thereafter the solvent was distilled off and the residue caused to crystallized by addition of ethyl acetate. The HCl salt produced was recrystallized from ethanol. Its melting point was 158–160° C. and the yield was 4 g.

EXAMPLE 26

[3-phenyl-3-hydroxy-propyl-(2)]-{3-[4-phenylthiazolyl-(2)]-3-hydroxy-propyl-(1)}-amine

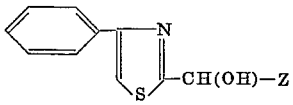

6 g. (0.015 mol) of 1-{Z}-[4-phenyl-thiazolyl-(2)]-ketone·HCl were suspended in 60 ml. of methanol and reduced by the addition of 0.6 g. (0.016 mol) of sodium borohydride. After 1 hour the solvent was distilled off and the residue dissolved in acetone. Fumaric acid was added to such solution to precipitate out the fumarate salt. The base was again set free from the fumarate with aqueous NaOH. The resulting oily base was taken up in ether and converted to the HCl salt with isopropanolic HCl and such salt recrystallized from ethanol. Its melting point was 178–181° C. and the yield was 2.5 g.

EXAMPLE 27

[3-phenyl-3-hydroxy-propyl-(2)]-{3-[thienyl-(2)]-3-hydroxy-propyl-(1)}-amine

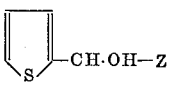

63 g. (0.2 mol) of 1-{Z}-thienyl-(2)-ketone·HCl and 300 g. of aluminum isopropylate were heated to 130° C. for 2 hours in 2 liters of isopropanol and the acetone produced during the reduction distilled off over a column. After 7 hours the cooled solution was decomposed by addition of 100 g. of citric acid in 200 ml. of water and then rendered strongly alkaline with aqueous NaOH. The organic phase was dried over calcium oxide and the solvent distilled off under vacuum. The amino alcohol product melted at 123–125° C. after it was recrystallized from 50% ethanol. Upon addition of an equimolor quantity of HCl an HCl salt was obtained which had a melting point of 152–155° C. The yield was 13 g.

EXAMPLE 28

[3-phenyl-3-hydroxy-propyl-(2)]-{3-[cumaronyl-(2)]-3-hydroxy-propyl-(1)}-amine

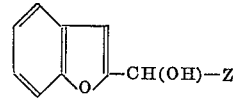

18 g. (0.05 mol) of 1-{Z}-cumaronyl-ketone·HCl were suspended in 100 ml. of ethanol and reduced at room temperature with 2 g. of sodium borohydride dissolved in 50 ml. of ethanol. After 1 hour, 50 ml. of concentrated HCl were added and the NaCl produced filtered off. The solvent was then distilled off under vacuum and the residue recrystallized from isopropanol/ethyl acetate (1:1). The HCl salt produced melted at 210–215° C. with decomposition. The yield was 11 g.

EXAMPLE 29

[3-phenyl-3-hydroxy-propyl-(2)]-{[3-thionaphthenyl-(3)]-3-hydroxy-propyl-(1)}-amine

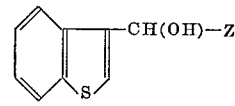

19 g. (0.05 mol) 1-3-[phenyl-3-hydroxy-propyl-(2)-amino]-propionyl}-thionaphthene·HCl were suspended in 100 ml. of ethanol and reduced with 2 g. of sodium borohydride in 50 ml. of ethanol at room temperature. After 1 hour the reaction mixture was filtered and the solvent distilled off and the residue dissolved in ether. The HCl salt was precipitated from the ether solution by addition of ethanolic HCl and recrystallized from isopropanol. Its melting point was 167–170° C. and the yield was 12 g.

What is claimed is:

1. A compound of the formula:

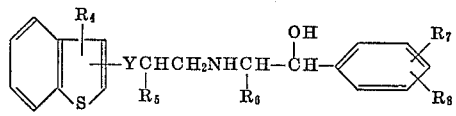

the pharmacologically acceptable salts thereof and the pharmacologically acceptable quaternary ammonium salts thereof, wherein $R_4$ is selected from the group consisting of hydrogen, hydroxyl, nitro and lower carboalkoxy, $R_5$ and $R_6$ are selected from the group consisting of hydrogen and methyl, $R_7$ and $R_8$ are selected from the group consisting of hydrogen, halogen and lower alkoxy and Y is selected from the group consisting of —CO— and —CH(OH)—

2. A compound according to claim 1 which is 1-3[3-[3-phenyl-3-hydroxypropyl - (2) - amino]-propionyl]-thionaphthene.

3. A compound according to claim 1 which is [3-phenyl-3-hydroxypropyl - (2)]-[[3-thionaphthenyl-(3)]-3-hydroxypropyl-(1)]-amine.

References Cited

UNITED STATES PATENTS 3,514,465   5/1970   Posselt et al.  _____ 260—296

HENRY R. JILES, Primary Examiner

C. M. SHURKO, Assistant Examiner